Oct. 11, 1955  C. A. OTTO  2,720,378
FLUID PRESSURE OPERATED DAMPERS
Filed March 29, 1951  2 Sheets-Sheet 1
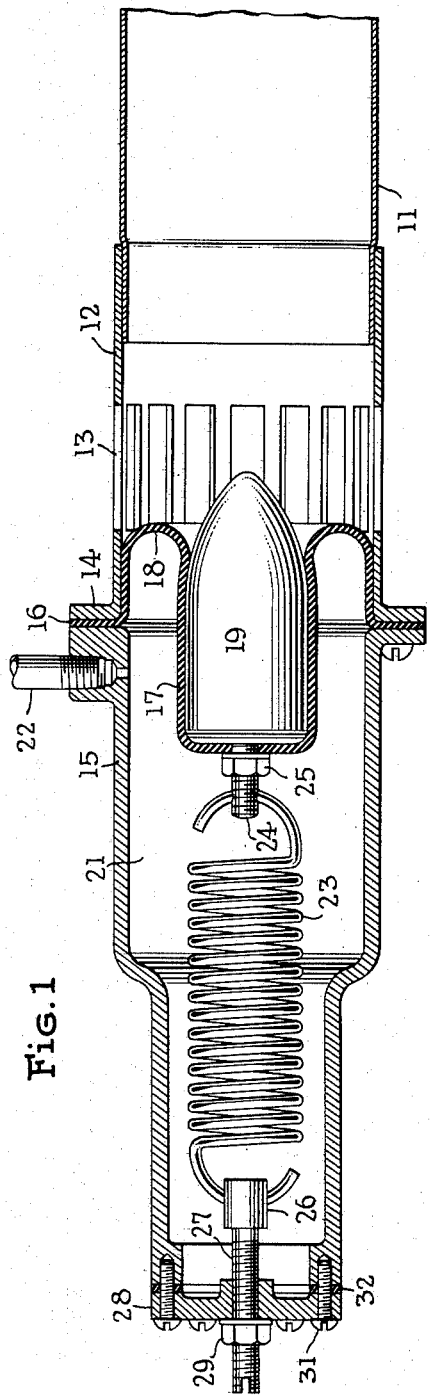
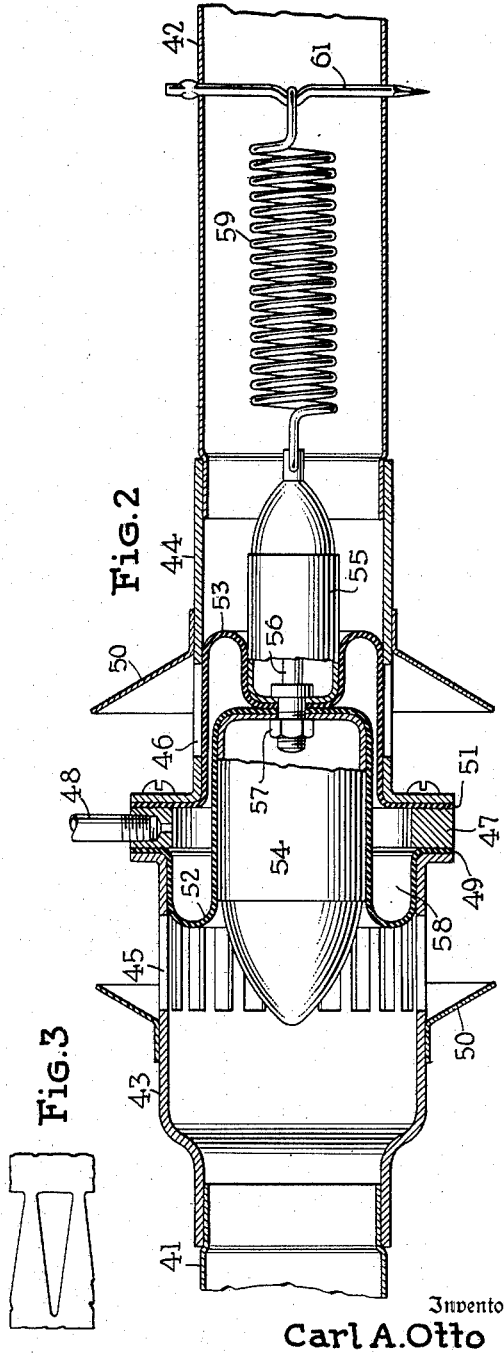
Inventor
Carl A. Otto
Attorneys

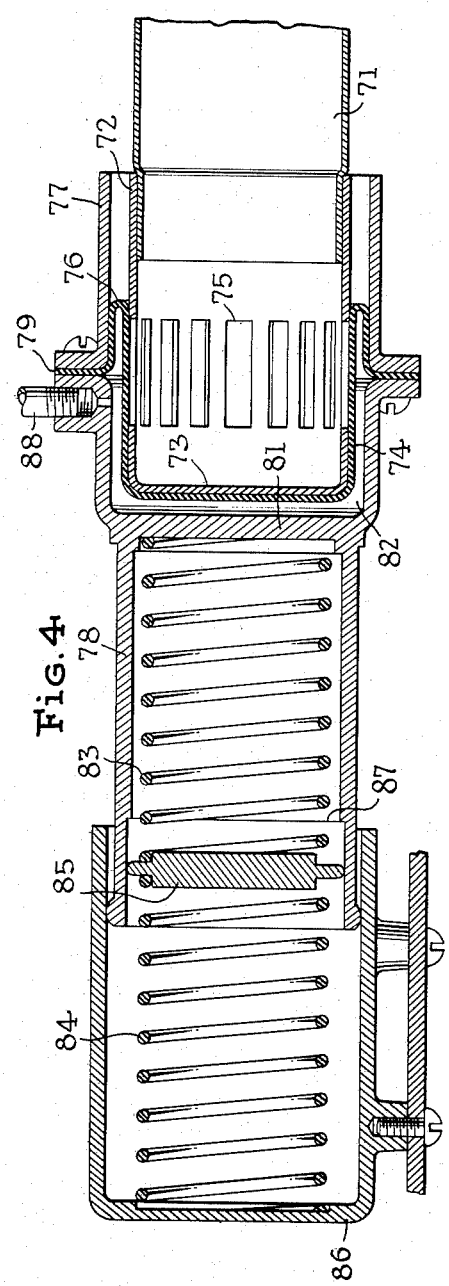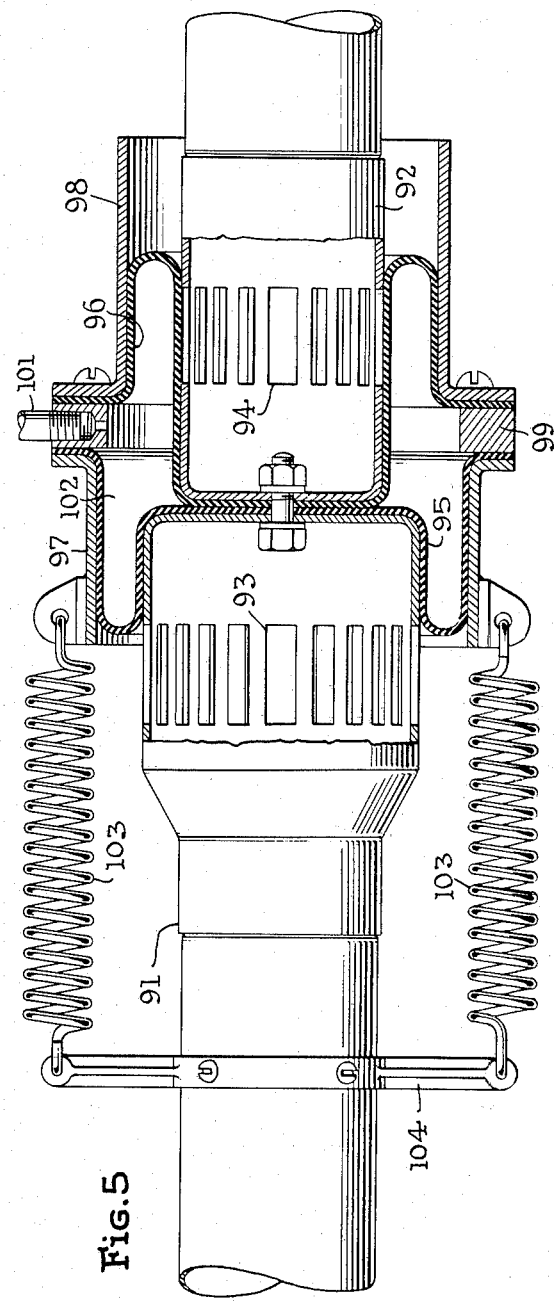

United States Patent Office 2,720,378
Patented Oct. 11, 1955

2,720,378

FLUID PRESSURE OPERATED DAMPERS

Carl A. Otto, Milwaukee, Wis., assignor to Johnson Service Company, Milwaukee, Wis., a corporation of Wisconsin Application March 29, 1951, Serial No. 218,140

2 Claims. (Cl. 251—61)

This invention relates to pressure-motor-operated dampers, and can be embodied in single dampers and in dual or mixing dampers. One outstanding advantage is the ease with which the damper can be designed to afford special flow-rate characteristics by changing the contour of the ports.

Important space economies are made possible by the fact that the motor and damper are combined in a single moving part which is short and can be mounted within the duct or an extension thereof.

Several typical embodiments will now be described by reference to the accompanying drawings, in which:

Fig. 1 is an axial section of a duct and attached single damper and actuating motor. The damper closes in response to rising pressure in the motor.

Fig. 2 is a similar section showing two axially alined ducts with a duplex damper and differential actuating motor interposed between the proximate ends of the ducts.

Fig. 3 is a fragmentary view showing the possibility of affording specially changing flow-rates as the damper moves.

Fig. 4 is a section generally similar to Fig. 1 showing a damper which opens in response to rising pressure in the motor. The possibility of using very long low-scale biasing springs is here illustrated.

Fig. 5 is a section similar to Fig. 2 showing a modified type of duplex damper in which (as in the structure of Fig. 4) the motor includes a sleeve which encircles the end of the duct and shifts in the direction of its axis.

In Fig. 1 a duct for conducting fluid under moderate pressure (commonly air) is indicated at 11, and is shown connected to a tubular valve-body 12 having a circumferential series of slot ports 13 through which (when open) the fluid may discharge for ventilating, heating, cooling or other purposes.

The body 12 has an end flange 14 by which it is connected to the similarly flanged motor body 15. The flanges confine the peripheral flange 16 of a cup-like member 17 formed of rubber-like material, which preferably has no fabric or other reinforcements. The purpose is to afford a freely rolling annular fold 18 which is formed by turning the tubular or cup-like member through itself.

The central portion of member 17 is sustained by a generally cylindrical member 19. The relative diameters of the parts 12 and 19 and the thickness and physical characteristics of member 17 are so coordinated that member 17 at annular fold 18 affords a rolling seal and valve which centers member 19 and seats outward in member 12 with sufficient force to seal ports against pressure in duct 11.

The chamber 21 within body 15 is the motor chamber, in which a motive pressure-fluid, admitted and exhausted through line 22, acts on member 17 to urge it in a port-closing direction. Line 22 leads from any appropriate pressure regulating device and could be the branch line of a pneumatic thermostat, such as those manufactured by applicant's assignee.

A spring 23 is used to bias the members 17 and 19 in the valve-opening direction. It is connected at one end with stud 24 fixed in member 19. The stud passes through the center of member 17, and a nut 25 with washer produces a tight joint. The opposite end of spring 23 is connected with block 26 which is swiveled in the end of stud 27. This is threaded into cap 28 and locked in adjusted positions by check nut 29. Cap 28 is held by screws 31 as shown and thus is removable for access purposes. A gasket 32 is provided. Thus the spring is accessible and its tension is adjustable.

If it is desired that the area through ports 13 vary directly in proportion to the motion of the rolling seal, the ports may be rectangular as shown. As shown in Fig. 3 the width of all or some of the ports may vary at points in their length to modify the rate of change of port-area. In Fig. 3 the ports are tapered or triangular, but various other port contours will suggest themselves to meet particular requirements. This possibility may be availed of with any of the embodiments herein described. In duplex valves such as those shown in Figs. 2 and 5, either or both sets of ports may have special shapes and the two sets of specially shaped ports may be differently formed.

Fig. 2 shows one way of embodying the invention in a mixing valve or damper. A familiar field of use is to control simultaneously in inverse senses the flow of two media to a mixing chamber. For convenience in discussion the fluids will be called warm air and cold air.

Assume that 41 is a warm air duct and 42 the cold air duct. They lead to two flanged valve bodies 43 and 44 each with an annular series of slot ports 45 and 46. Conical deflectors 50 may be mounted adjacent ports 45 and 46, as shown, to cause local mixing of the issuing streams of air. Between the flanges of the bodies 43 and 44 are assembled a spacer ring 47 with branch line 48 and the peripheral flanges 49 and 51 of two rolling seal members 52, 53 (similar to member 17).

Associated with members 52, 53 are cylindrical sustaining members 54, 55 of different diameters (similar to member 19), assembled end to end and clamped upon central portions of members 52, 53 by a stud 56 and nut 57. Pressure developed in motor space 58 by the admission and exhaust of pressure fluid through branch line 48 will urge the members 54, 55 to the left. To oppose this action a coiled tension spring 59 is used. It is connected at one end to member 55 and at the other end to the cross-pin 61.

The relative diameters of parts 44 and 55 and of 43 and 54 and the thicknesses of members 52 and 53 are coordinated as described for similar parts in Fig. 1. The parts 52 and 53 are so dimensioned and the ports 45, 46 so located that closing of ports 45 proceeds as opening of ports 46 takes place and vice versa. The shape and dimension of the ports 45, 46 can be chosen to afford desired flow characteristics, as already explained.

The two embodiments so far described contemplate that the rolling seals are internal to the ducts. For some cases external seals are desirable, and they can be used both in single and in duplex units. As shown in Figs. 4 and 5 the general principles of Figs. 1 and 2 can be embodied in forms having external rolling seals.

In Fig. 4 the duct 71 leads to body 72 which has a closed end 73. This serves as the sustaining member for the rolling seal 74 and has, near the closed end, an annular series of ports 75. The seal 74 fits over the closed end of the duct and its fold 76 rolls between body 72 and a flanged extension 77 of body 78. The peripheral flange 79 of seal 74 is clamped between parts 77 and 78.

Body 78 is generally tubular and is divided by partition 81 into a motor chamber 82 and a confining cup for a compression spring constructed in two sections 83, 84 with an interposed guiding spacer 85. The end of body 78 is confined in a longitudinal guideway in fixed member 86. By mounting spacer 85 in a short counter-bore leading to a stop shoulder 87 it is possible to render spring 83 inactive after partial displacement of member 78 to the left. When spacer 85 engages shoulder 87, further compression of spring 83 is inhibited and spring 84 functions alone at a higher "scale."

The branch line 88 leads to motor chamber 82, and must be flexible to accommodate motion of member 78. Operation is similar to that of the device of Fig. 1 but opening of the ports (instead of closing) occurs in response to rising branch line pressure.

The structure of Fig. 5 differs from that of Fig. 2 in the same general way that the structure of Fig. 4 differs from that of Fig. 1.

The two valve bodies 91 and 92 have ports 93 and 94. Their ends are closed and clamp between them the two rolling seals 95 and 96. The ducts are of different diameters and are encircled by sleeves 97, 98 (also of unequal diameters) which shift together and outwardly confine the rolling seals 95, 96. The sleeves 97, 98 have flanged ends connected to spacer ring 99 and serving to clamp to it the marginal flanges of the seals 95, 96.

The flexible branch line 101 leads to the motor chamber 102. Two biasing springs 103 are used and react between assembly 97, 98, 99, and a fixed yoke 104. The valve action is the same as that described for Fig. 2, one set of ports starting to open as the other starts to close.

Claims specific to the structures of Figures 2 and 5 are presented in a divisional application Serial No. 397,290, filed December 7, 1953.

The concept can be variously embodied and has the advantage of compactness, silence of action, large port area, absence of mechanism interposed between the motor and the valve or valves and above all low internal friction, so that its response is subject to minimum practicable lag.

I claim:

1. A combined valve and pressure-motor comprising in combination, a generally cylindrical internal member; a generally cylindrical tubular external member encircling the internal member with substantial annular clearance between said members, said members being relatively movable in the direction of their axes and one member having an annular series of flow ports; a rolling seal bridging said annular clearance and comprising a tube of rubber-like material turned through itself to afford a rolling fold which yieldingly reacts radially on both members, opposite ends of said tube being attached respectively to the internal and to the external member, and the parts being so proportioned and arranged that said rolling tubular seal progressively obstructs and exposes said ports as the internal and external members move progressively in one or the other relative direction, and serves also as means to maintain said members concentric at said seal; a cap connected with said external member and engaging one end of said rubber-like tube to enclose therewith a motor space, said cap having a longitudinal extension; sustaining means fixed relatively to said internal member and having a guide-way remote from said rolling seal in which said extension is guided; a spring reacting between said cap and said sustaining means; and means for admitting and exhausting pressure fluid to and from said motor space.

2. The combination defined in claim 1 in which the spring acts in a port-closing direction.

References Cited in the file of this patent

UNITED STATES PATENTS

| 1,851,062 | Protzer | Mar. 29, 1932 |
| 2,209,844 | Otto | July 30, 1940 |
| 2,274,359 | Chater | Feb. 25, 1942 |
| 2,343,584 | Scheele | Mar. 7, 1944 |
| 2,391,605 | Walton | Dec. 25, 1945 |

FOREIGN PATENTS

| 19,951 | Germany | 1882 |
| 624,576 | Great Britain | June 13, 1949 |